(12) United States Patent
Choi

(10) Patent No.: US 9,063,396 B2
(45) Date of Patent: Jun. 23, 2015

(54) INTEGRATED PHOTOBOOTH TECHNOLOGY FOR PASSENGER VEHICLES

(71) Applicant: Emily Choi, Boulder, CO (US)

(72) Inventor: Emily Choi, Boulder, CO (US)

(*) Notice: Subject to any disclaimer, the term of this patent is extended or adjusted under 35 U.S.C. 154(b) by 123 days.

(21) Appl. No.: 13/841,819

(22) Filed: Mar. 15, 2013

(65) Prior Publication Data

US 2013/0243413 A1    Sep. 19, 2013

Related U.S. Application Data

(60) Provisional application No. 61/612,601, filed on Mar. 19, 2012.

(51) Int. Cl.
G03B 29/00     (2006.01)
G03B 17/53     (2006.01)
G06Q 30/02     (2012.01)

(52) U.S. Cl.
CPC ............ *G03B 17/53* (2013.01); *G06Q 30/0284* (2013.01)

(58) Field of Classification Search
CPC ....... G03G 15/02; G03G 15/00; G03G 19/00; G03G 19/02; G03G 29/00
USPC .................................................... 396/2, 429
See application file for complete search history.

(56) References Cited

U.S. PATENT DOCUMENTS

| | | | |
|---|---|---|---|
| 6,212,472 B1* | 4/2001 | Nonaka et al. | 701/431 |
| 6,429,892 B1* | 8/2002 | Parker | 348/77 |
| 8,145,048 B2* | 3/2012 | Messier | 396/2 |
| 8,305,479 B2 | 11/2012 | Park | |
| 2007/0275736 A1* | 11/2007 | Baek et al. | 455/457 |
| 2010/0194961 A1* | 8/2010 | Patel | 348/333.01 |
| 2013/0185152 A1* | 7/2013 | Aaron et al. | 705/14.51 |

FOREIGN PATENT DOCUMENTS

| | | |
|---|---|---|
| EP | 2071289 | 6/2009 |
| EP | 2498103 | 9/2012 |
| JP | 09284687 | * 10/1997 |

OTHER PUBLICATIONS

Translation of JP Publication No. 09-284,687; Inventor: Arai J et al.; Publication Date: Oct. 31, 1997.*

* cited by examiner

*Primary Examiner* — Clayton E Laballe
*Assistant Examiner* — Fang-Chi Chang
(74) *Attorney, Agent, or Firm* — Duft Bornsen & Fettig

(57) ABSTRACT

Methods and structure are provided for integrating photography systems into passenger vehicles. The system includes an imaging device, a billing system, and a controller. The imaging device is able to generate a photograph of a passenger in a vehicle. The billing system is within the vehicle, and accepts payment from the passenger for a fare. The controller is able to access the billing system to accept payment for the generated photograph.

20 Claims, 11 Drawing Sheets

INTEGRATED PHOTOBOOTH TECHNOLOGY FOR PASSENGER VEHICLES

CROSS REFERENCE TO RELATED APPLICATIONS

This document claims priority to U.S. Provisional Patent Application No. 61/612,601 filed on Mar. 19, 2012 (entitled "Taxi Photo Booth Processing System") which is hereby incorporated by reference.

FIELD OF THE INVENTION

The invention relates generally to digital photography and more specifically to photography systems for passenger vehicles.

BACKGROUND

Digital social networking services such as Facebook and Twitter have provided new avenues for instantaneous communication between friends, relatives, and social circles. For example, many people post updates and photos on Facebook to illustrate their social and travel experiences. Smart phones provide a variety of applications, or "apps," for interacting with these social networking services. For example, smart phones are typically configured with cameras that allow the user to take a picture and quickly post that picture to a social networking service.

Taxi cabs are now enabled with video interfaces that allow users to watch videos and/or pay for cab fares. For example, many taxi cab companies in Las Vegas supplement their revenues by displaying advertisements to passengers through a Liquid Crystal Display (LCD) screen. Some in-cab systems are capable of displaying the cab fare to the passenger, and many in-cab systems also include magnetic credit card readers for paying cab fare. However, this is the extent of the video services provided by taxi cabs.

SUMMARY

Systems and methods herein provide photography systems that can be added to any suitable passenger vehicles (e.g., taxi cabs, buses, ferries, etc.). The photography systems can generate photographs of passengers and deliver the photographs to the passengers (e.g., through a wireless connection to a mobile device, through email, etc.). These photographs can then be shared with social networking services as desired. Furthermore, the photography systems are coupled with the billing system of the passenger vehicle. Thus, the passenger vehicle is effectively transformed into a moving photo booth.

One exemplary embodiment is a photography system. The system includes an imaging device, a billing system, and a controller. The imaging device is able to generate a photograph of a passenger in a vehicle. The billing system is within the vehicle, and accepts payment from the passenger for a fare. The controller is able to access the billing system to accept payment for the generated photograph.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
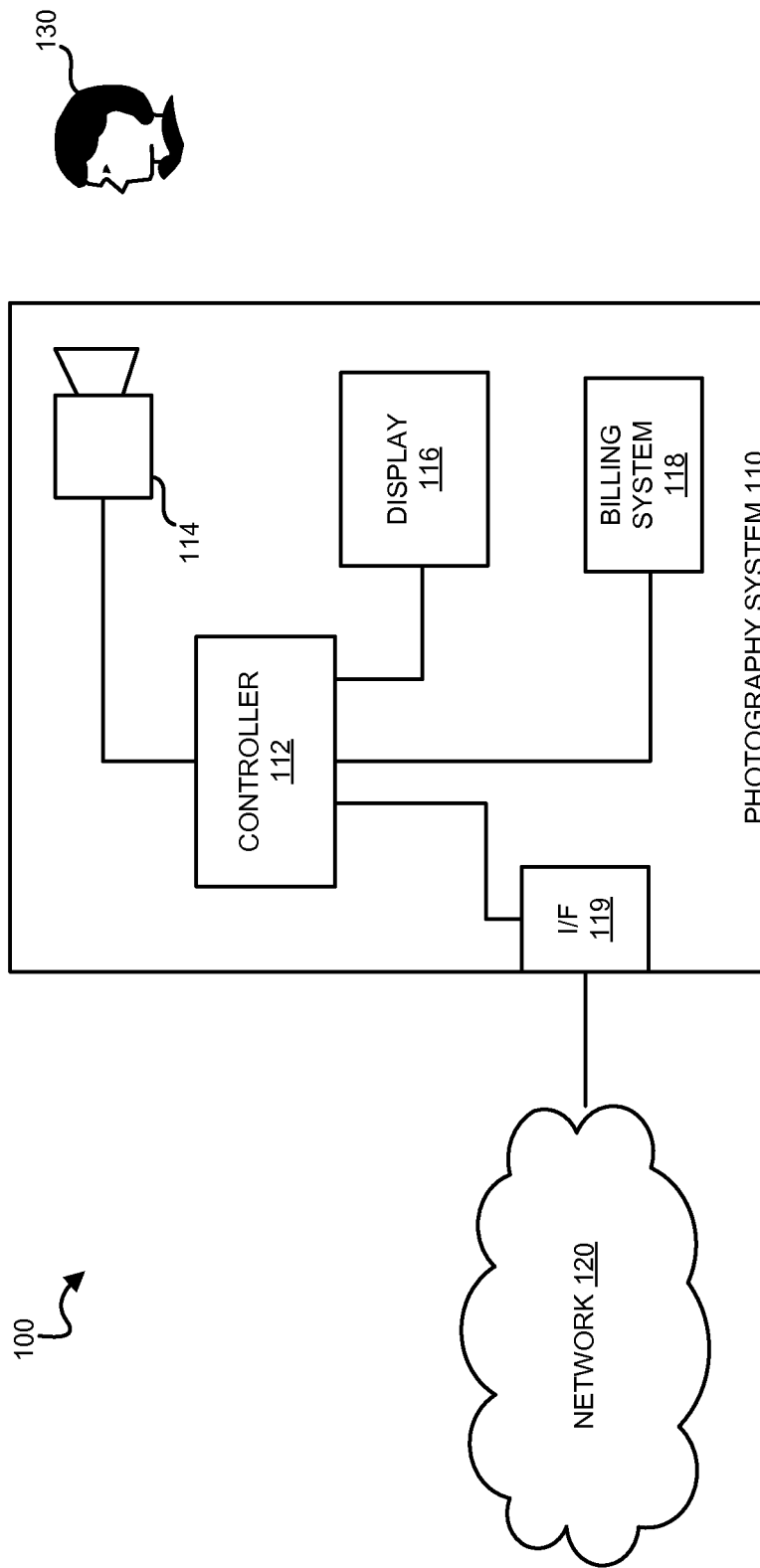
FIG. 1 is a block diagram of an exemplary photography system for a passenger vehicle.

FIG. 1 is a block diagram 100 of an exemplary photography system 110 for a passenger vehicle. Photography system 110 is kept within a passenger vehicle, such as a taxi cab, limousine, bus, boat, etc. While the vehicle is traveling, passengers may use photography system 110 to take photographs of themselves. Furthermore, photography system 110 is integrated with a billing system for the vehicle (such as a magnetic credit card reader for the vehicle, used to charge a fare to passengers). This allows a passenger to purchase photographs in the same manner that they pay a fare for the vehicle, which makes payment more convenient.

As illustrated in FIG. 1, photography system 110 includes imaging device 114, display 116, billing system 118, and network interface 119. Imaging device 114 comprises any suitable element capable of capturing photographic images of a passenger. For example, imaging device 114 may comprise a digital camera that collects light to create digital photographs of passenger 130. Imaging device 114 may further store those digital photographs in memory in a digital picture format (e.g., Portable Network Graphics (PNG), Joint Photographic Experts Group (JPEG), etc.).

Display 116 comprises any system, component, or device operable to display information to a passenger. For example, display 116 may comprise a touch screen that presents a Graphical User Interface (GUI) to a passenger. In one embodiment, a passenger operates a GUI presented by display 116 in order to select, touch-up, or request delivery of photographs taken by imaging device 114. In a further embodiment, display 116 may comprise a Passenger Information Monitor (PIM) for a taxi cab.

Billing system 118 is capable of receiving payment from a passenger for services and/or products provided by photography system 110. For example, billing system 118 may include a magnetic credit card reader used by a taxi cab to charge fares to passengers.

In one embodiment, imaging device 114 takes a photograph of the passenger, and then takes a photograph of a check or credit card of the passenger. Billing system 118 then acquires billing information based on the photograph of the check or credit card taken by imaging device 114. In these circumstances, controller 112 identifies relevant billing information from the photograph of the check or credit card (e.g., by using Optical Character Recognition (OCR)), and provides this billing information to billing system 118. Billing system 118 may store the billing information and provide it to an external entity such as a credit card company via network interface 119.

Network interface 119 comprises any system, component, or device capable of contacting a data network external to photography system 110. For example, network interface 119 may use cellular protocols to connect with a data network of a cellular provider, may use IEEE 802.11 standards to connect with a Wireless Local Area Network (WLAN), or may include a wired interface for connecting to a device that can wirelessly contact an existing data network. Network 120 may comprise a proprietary data network, the Internet, etc.

Controller 112 manages the operations of the various components of photography system 110 in order to generate photographs, provide user interfaces to passengers, charge passengers for generated photographs, etc. Controller 112 may be implemented as custom circuitry, as a processor executing programmed instructions stored in program memory, or some combination thereof. The particular arrangement, number, and configuration of components described herein is exemplary and non-limiting.

While in operation, photography system 110 generates photographs for passengers, and accepts payment for generated photographs using the same billing system that the vehicle uses to charge passengers fares. This allows the passengers to purchase a photographic experience in the same convenient way that they purchase a trip.

Figure 2:
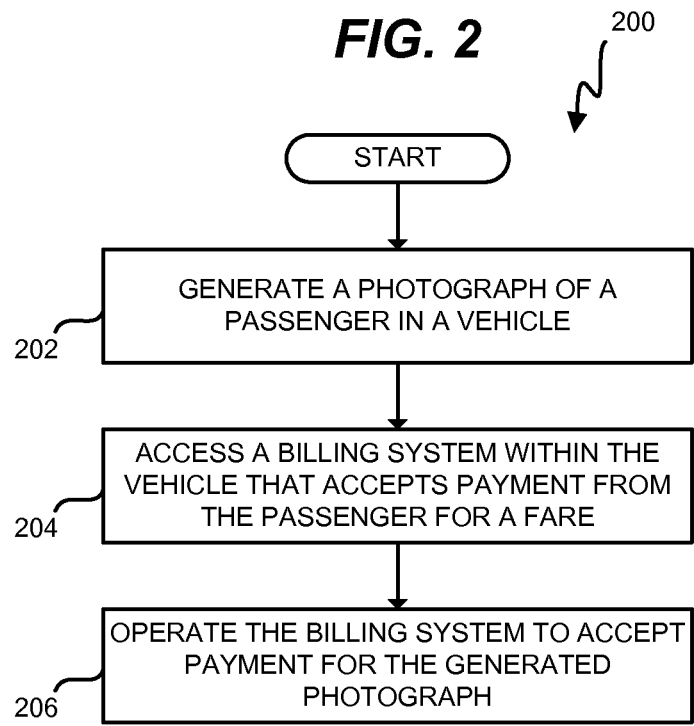
FIG. 2 is a flowchart describing an exemplary method of operating a photography system of a passenger vehicle.

FIG. 2 is a flowchart describing an exemplary method 200 of operating a photography system of a passenger vehicle. Assume, for this embodiment, that a passenger has entered the vehicle, and that the passenger has used a touchscreen on display 116 in order to request a photograph during travel.

In step 202, controller 112 operates imaging device 114 to generate a photograph of the passenger in the vehicle. For example, the photograph may comprise a digital image file (JPEG, PNG, TIFF, etc.) that has been captured by a light sensitive circuit. The generated photograph may be kept in memory at photography system 110, in order to enable revisions or alterations to the photograph at a later point in time. In one embodiment, controller 112 stores the photograph on an Internet-accessible location (e.g., for a website) maintained by a server. The passenger may then access the photograph stored on the server by following a Uniform Resource Locator (URL) shown on display 116. The website may allow the user to print, edit, purchase, or e-mail the photograph, or even share the photograph with other users of a social networking service.

In step 204, controller 112 accesses billing system 118, which resides within the vehicle and accepts payment from the passenger for a fare. In one embodiment, billing system 118 is the only billing system that exists within the vehicle. For example, controller 112 may operate on a tablet device that includes an attached magnetic card reader that is already used by the vehicle to charge fares to passengers. Therefore, controller 112 may access billing system 118 by initiating contact with billing system 118 or otherwise coordinating communications with billing system 118.

In step 206, controller 112 operates billing system 118 to accept payment for the generated photograph. For example, in one embodiment controller 112 receives credit card information from billing system 118 via a magnetic credit card reader, and transmits this credit card information to a credit card company via network interface 119 for verification.

Once payment has been accepted, controller 112 may further deliver the photograph to the passenger by any appropriate means. For example controller 112 may direct a printer in the vehicle to physically print the photograph, may order a printed version of the photograph from a pint shop for mail delivery, may deliver the photograph electronically to the passenger via e-mail or a Universal Serial Bus (USB) interface, may deliver a link to the photograph via a text message to a phone number of the passenger, may post the photograph to a social networking account of the passenger, etc.

Even though the steps of method 200 are described with reference to photography system 110 of FIG. 1, method 200 may be performed in other systems. The steps of the flowcharts described herein are not all inclusive and may include other steps not shown. The steps described herein may also be performed in an alternative order.

Figure 3:
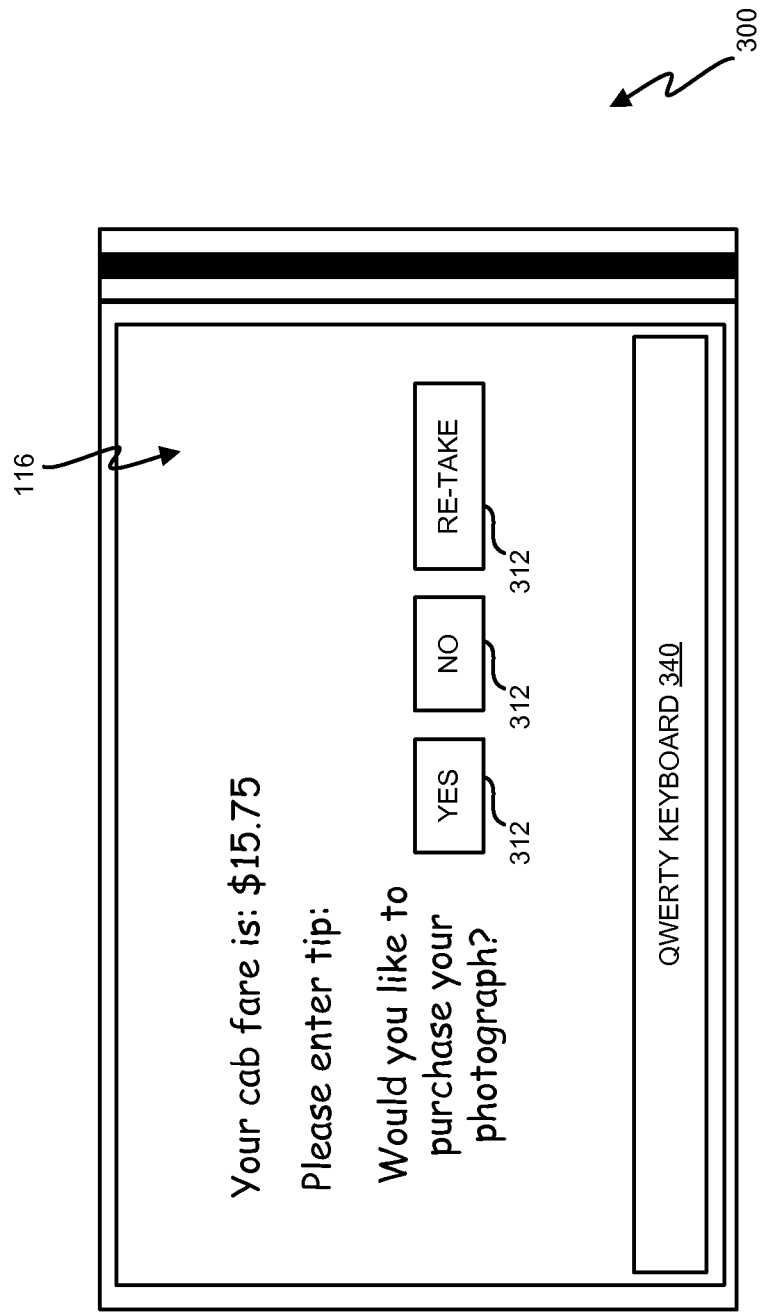
FIGS. 3-5 illustrate exemplary user interfaces and prompts for charging in a photography system.
Figure 4:
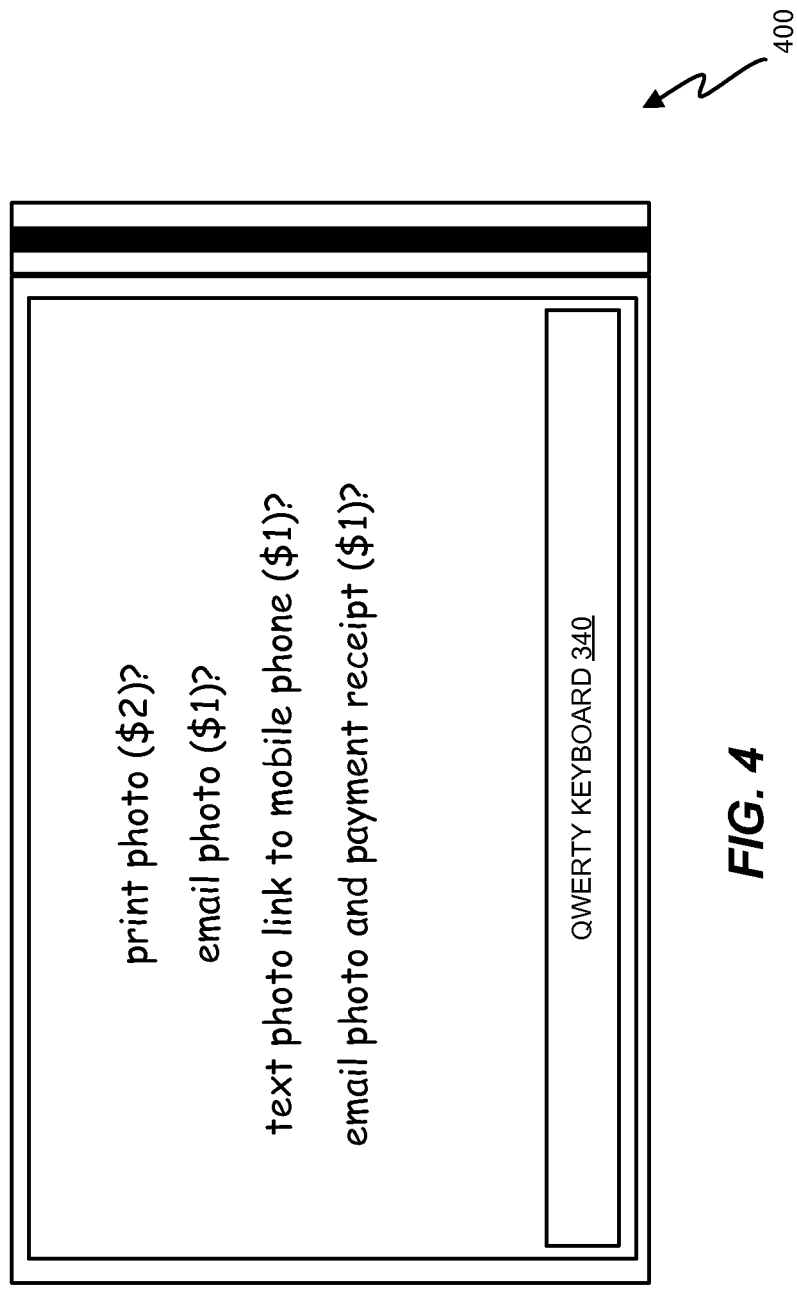
Figure 5:
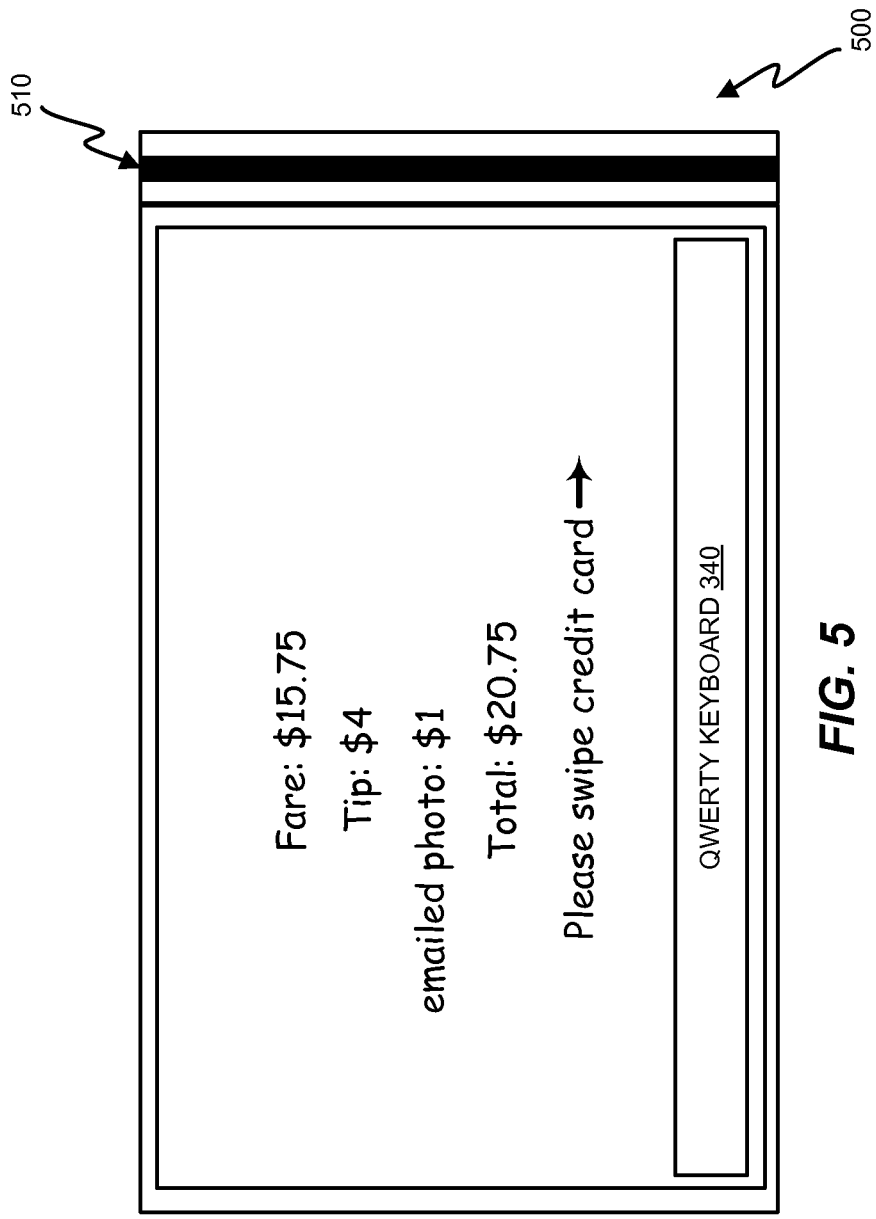

FIGS. 3-5 illustrate exemplary user interfaces and prompts for charging in a photography system. Assume, for this embodiment, that a passenger has entered a taxi cab and is traveling in the cab. In this embodiment, once the cab ride is complete and the passenger has taken a picture using photography system 110, controller 112 computes the cab fare and directs the passenger to add a tip to the fare via QWERTY keyboard 340, as illustrated in block diagram 300 of FIG. 3. In this regard, display 116 may include a touch screen interface that presents QWERTY keyboard 340 as an on-screen interface for the passenger. Alternatively, QWERTY keyboard 340 may be physically configured alongside the display 116.

Controller 112 also uses display 116 to display a prompt to the passenger. The prompt asks the passenger whether the passenger wishes to purchase the photograph. This prompt may include a preview of the photograph for the passenger to review. In touch-screen interfaces, the prompt may be accompanied by user interface elements 312 that are used to purchase the photograph, retake the photograph, or cancel the entire process. Assume, for the sake of discussion, that the passenger decides to purchase the photograph.

In block diagram 400 of FIG. 4, controller 112 allows the passenger to select a delivery method for the photograph. For example, the passenger may request a printed photograph, a digital photograph delivered via e-mail, a text message link to a copy of the photograph stored online, and/or a digital photograph shared via a social networking service (e.g. Facebook).

Each delivery method may be associated with a defined fee. Some delivery methods may be free, and/or may be supported by advertising inserted onto or next to the photograph. For example, a photograph may be delivered for free (or a reduced cost) if the passenger updates their social networking profile in order to "Like" a specific company, product, or service. The passenger may select one or more delivery methods via a user interface (in this case, QWERTY keyboard 340). In block diagram 500 of FIG. 5, controller 112 determines the cost of the fare, and adds the cost of the photograph (and associated delivery method, if any) to the cost of the cab fare. Controller 112 then operates display 116 to show the total amount due for payment. The passenger may then swipe a credit card through credit card reader 510 in order to complete payment (note that in the present embodiment, reader 510 is a component of billing system 118). In a further embodiment, controller 112 may allow the passenger to provide payment for the fare via any of multiple means (e.g., cash, credit, check, etc.).

Figure 6:
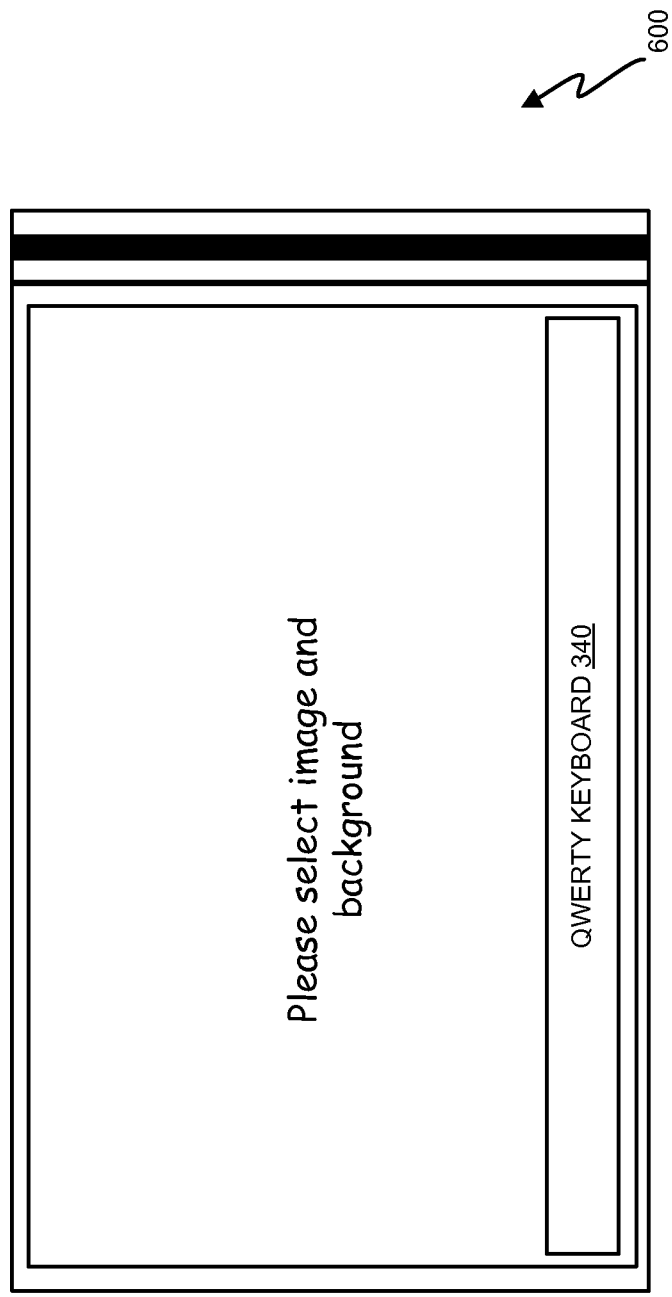
FIGS. 6-7 illustrate exemplary user interfaces and prompts for editing in a photography system.
Figure 7:
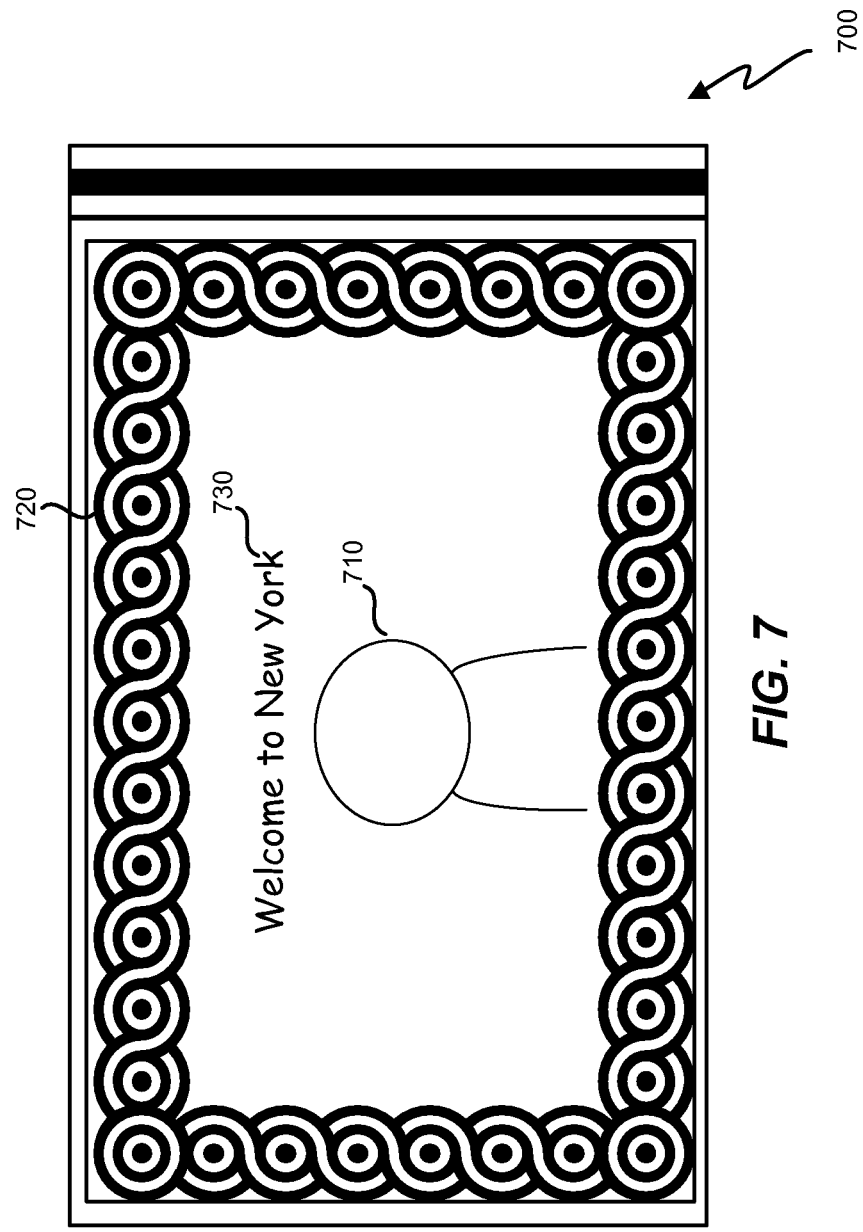

FIGS. 6-7 illustrate exemplary user interfaces and prompts for editing in a photography system. In these embodiments, controller 112 may further include features that allow a passenger to edit a photograph prior purchasing it. For example, controller 112 may be capable of adjusting the brightness or contrast in a photograph, removing red-eye from a photograph, or inserting a background and/or textual information into the photograph as the passenger desires. If a passenger in a taxi cab is visiting New York City, they may wish to use these photo editing features to memorialize their cab experience. For example, the passenger may generate a personalized photographic memento for scrapbooking or sharing (e.g., in order to generate a photograph that includes the statement "Welcome to New York City").

Alternatively, controller 112 may access a customized "app" or website that includes photo editing features for the photograph. In such systems, the user interfaces shown in FIGS. 6-7 are not included within the cab itself, but are rather provided to as part of a website or app accessible to an electronic device of the passenger (e.g., tablet, cellular phone, etc.). In such cases, the electronic device of the passenger may use the website/app to perform any desired touch-up or other photographic editing.

In one embodiment, the user interfaces and prompts of FIGS. 6-7 are used to select and edit photographs taken by photography system 110 before a passenger commits to purchasing the photograph. In FIG. 6, controller 112 directs the passenger to select (via an interface such as QWERTY keyboard 340) a photograph taken by imaging device 114, as well as any desired background or textual content. In FIG. 7, the passengers selects photograph 710, and decides to incorporate background 720 and textual information 730 with photograph 710. This combined image may then be delivered to the passenger once the passenger has purchased it.

In a further embodiment, photography system 110 is capable of determining the location of the vehicle, and integrating image data for the location into photographs taken for passengers. For example, a photograph taken near the Empire State building in New York City may have images of the Empire State Building inserted into it. Associating the passengers' photographs with famous landmarks or locations helps to contextualize the travel experiences of those passengers. With this feature in mind, FIG. 8 is a flowchart illustrating an additional method of operating a photograph system for a passenger vehicle.

Figure 8:
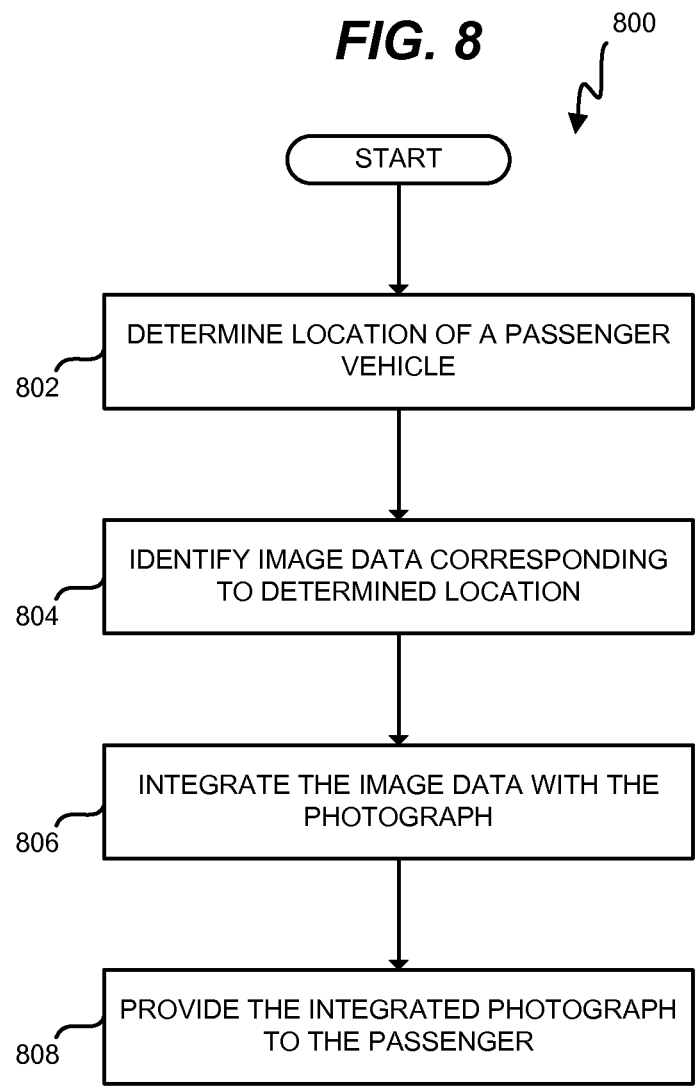
FIG. 8 is a flowchart illustrating an additional method of operating a photograph system for a passenger vehicle.

According to FIG. 8, in step 802 controller 112 determines the location of the passenger vehicle. A location may be defined as a specific set of spatial coordinates, such as a latitude and longitude or the intersection of two roads. A location may also be defined in relation to another object. For example, a location may be defined as a distance from a specific address, or even a distance from another vehicle. Controller 112 may acquire this location by querying a Global Positioning System (GPS) receiver within the passenger vehicle, or may include its own tracking system for determining the location of the vehicle. Controller 112 may correlate GPS coordinates with a mapping service (such as Google Maps) in order to determine street addresses.

In step 804, controller 112 identifies image data that corresponds to the determined location. This image data may be a textual description of the location, may be a picture of a landmark at or near the location, or may indicate any other suitable things that are located close to the current location of the passenger vehicle as it is traveling. For example, once a location of the vehicle is known, controller 112 may query an advertisement server to identify nearby business entities that are paying for ad space in the photograph (e.g., retailers, restaurants, etc.). Images of these business entities, advertisements describing these entities, or other information may then be integrated into the photograph. The image data may be stored on photography system 110, or controller 112 may access the image data via network 120.

In step 806, controller 112 integrates the image data with the photograph of the passenger. This may include modifying the photograph that was taken in order to insert the image data directly into the photograph, or may include placing the image data and the photograph into a larger image (e.g., in order to form a collage).

In step 808, controller 112 provides the integrated photograph to the passenger. This operation may be performed in any suitable manner. For example, the photograph may be delivered physically, electronically, etc. as discussed above with regard to method 200 of FIG. 2.

Even though the steps of method 800 are described with reference to photography system 110 of FIG. 1, method 800 may be performed in other systems. The steps of the flowcharts described herein are not all inclusive and may include other steps not shown. The steps described herein may also be performed in an alternative order.

Figure 9:
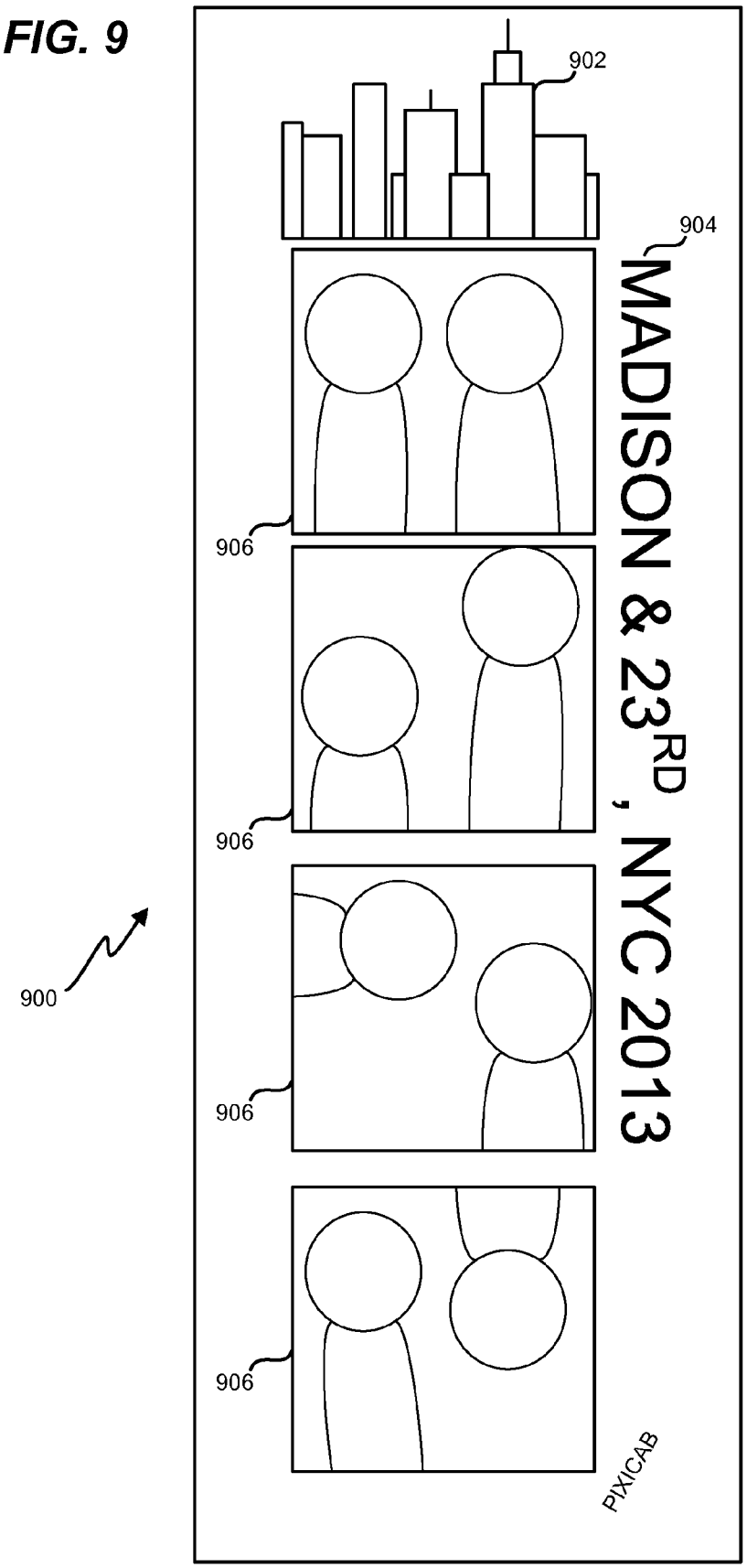
FIG. 9 is a block diagram of an exemplary set of photographs taken by a photography system using the method of FIG. 8.

FIG. 9 is a block diagram of an exemplary set of photographs taken by a photography system using method 800 of FIG. 8. According to FIG. 9, a set of photographs 906 are integrated into a single photo strip 900. The set of photographs were taken while a taxi cab for the passenger was located at the intersection of two roads: Madison Avenue and $23^{rd}$ St. Controller 112 has included image data 902 that depicts the city skyline as seen at that intersection, and has also added textual content 904 which describes the location. Thus, when the passenger purchases the photo strip, they will be able to memorialize their time at Madison and $23^{rd}$.

Figure 10:
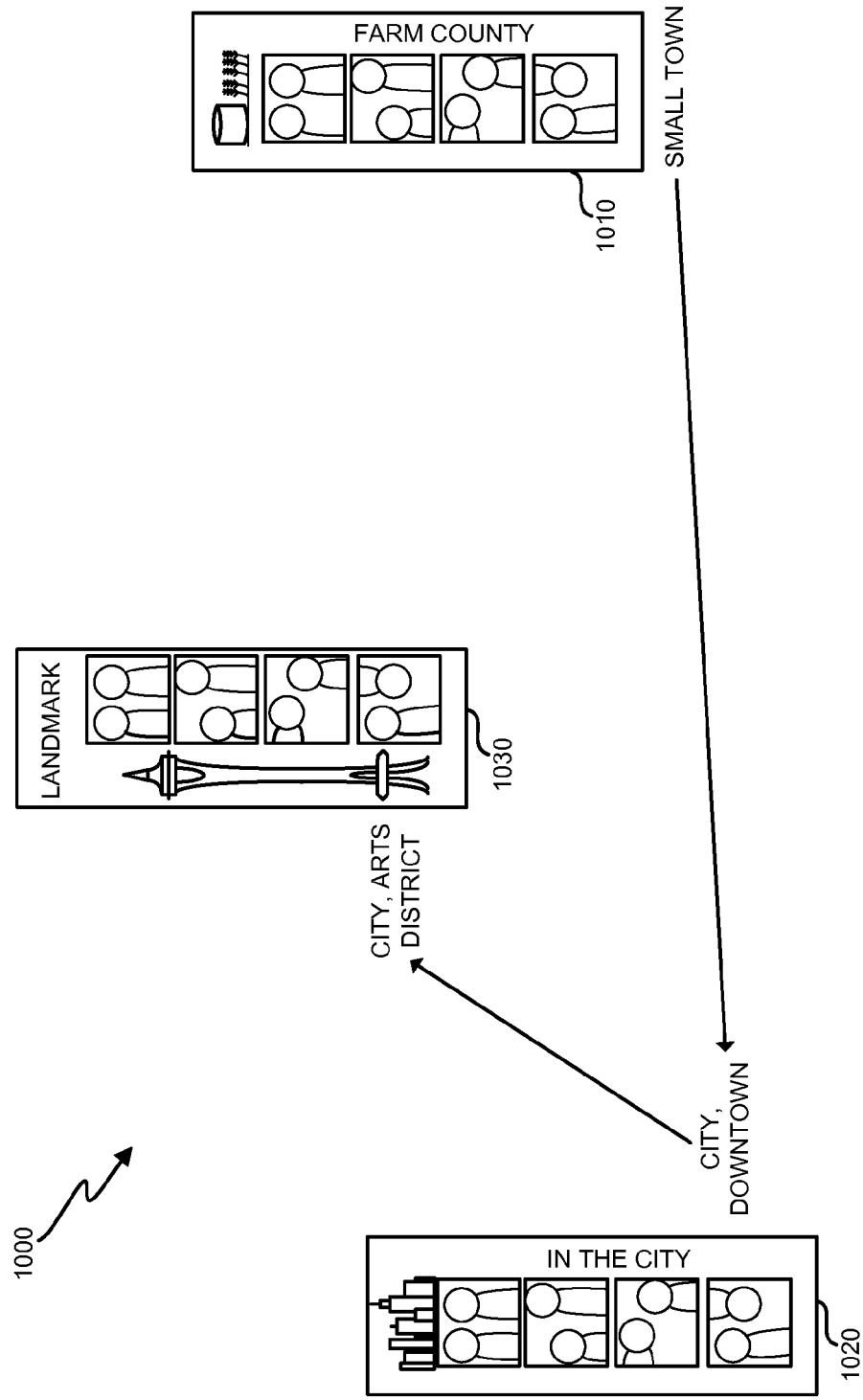
FIG. 10 is a block diagram of an exemplary set of photographs taken by a photography system of a passenger vehicle during a trip.

FIG. 10 is a block diagram 1000 of an exemplary set of photographs taken by a photography system of a passenger vehicle during a trip. According to FIG. 10, the trip passes by multiple locations, and a series of photographs (integrated into photo strips) are taken at each of the locations from within the vehicle. A controller of the photography system has added textual information to each photo strip that describes the location that the photo strip was taken, and also includes pictures from places that are close to the location that each photo strip was captured (e.g., within a quarter mile of the location). Thus, photo strip 1010 illustrates time spent in rural areas, photo strip 1020 illustrates time spent in a downtown of a city, and photo strip 1030 memorializes time spent in an arts district of a city. The passenger may then purchase all of the photo strips at once, or any desired combination thereof.

Example

In this example, details of an exemplary photography system are described with regard to a taxi cab that includes a tablet computer. The photography system is integrated into the tablet computer (e.g., an Apple IPAD brand tablet, a Samsung GALAXY brand tablet, etc.). The display is a touch screen on the tablet used to present and receive information for passengers. The controller of the photography system operates on a processor and memory of the tablet. The camera of the tablet is used by the controller to create photographs of passengers. The billing system is a magnetic credit card reader attached to the tablet (e.g., via a USB interface). The network interface of the photography system is a wireless data network interface of the tablet.

In this example, a passenger enters the taxi cab, and the cab driver starts an in-cab fare system that tracks total fare cost for the trip. During the trip, the tablet presents advertisements, weather, and other information to the passenger. The passenger operates the tablet to start an application for photography. When the photography application is initialized, the controller operates the camera of the tablet to take a picture of the passenger, and increases the brightness of the tablet screen to maximum in order to illuminate the taxi cab while the photograph is being taken. The photograph is then displayed to the passenger, who uses the touch screen to accept the photograph, or reject the photograph and take a new one. Once an acceptable photograph has been acquired, the controller uses the touch screen to query whether the passenger wishes to receive an advertisement-supported free version of the photograph, or a paid version of the photograph. If the passenger opts for an advertisement-supported photograph, the controller contacts an internet-accessible advertising server, and acquires one or more advertisements to integrate with the photograph. These advertisements are specific to the location of the passenger, and are placed alongside the photograph when the photograph is delivered.

Alternatively, if the passenger purchases a paid version of the photograph, the controller displays the cost of the photograph to the passenger, and the passenger swipes a credit card through the magnetic card reader. The credit card information is acquired by the controller, and then is used in order to accept payment.

Once a paid or free version of the photograph has been selected, the passenger provides an e-mail address or mobile phone number to the controller via the touch screen, and the controller operates the wireless data network interface of the tablet in order to transmit the photograph to a server. The server then sends the photograph to the passenger via e-mail, or sends a text message to the passenger that includes a URL link to the photograph stored at the server.

Once the trip is complete, the cab driver stops the fare system of the cab. The fare system of the cab transmits the total trip cost to the tablet, which presents the cost to the passenger via a touch screen. The passenger then swipes their card through the magnetic credit card reader in order to make a payment for the trip.

Figure 11:
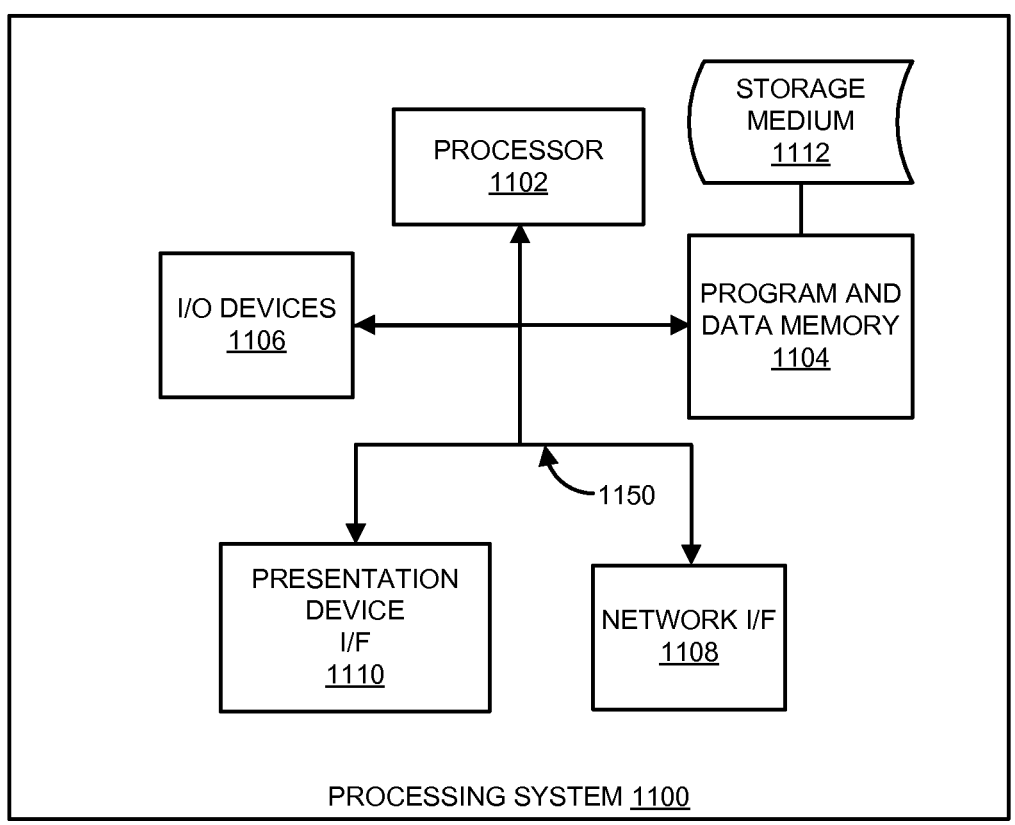
FIG. 11 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of photography system 100 to perform the various operations disclosed herein. FIG. 11 illustrates an exemplary processing system 1100 operable to execute a computer readable medium embodying programmed instructions. Processing system 1100 is operable to perform the above operations by executing programmed instructions tangibly embodied on computer readable storage medium 1112. In this regard, embodiments of the invention can take the form of a computer program accessible via computer readable medium 1112 providing program code for use by a computer (e.g., processing system 1100) or any other instruction execution system. For the purposes of this description, computer readable storage medium 1112 can be anything that can contain or store the program for use by the computer (e.g., processing system 1100).

Computer readable storage medium 1112 can be an electronic, magnetic, optical, electromagnetic, infrared, or semiconductor device. Examples of computer readable storage medium 1112 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1100, being suitable for storing and/or executing the program code, includes at least one processor 1102 coupled to program and data memory 1104 through a system bus 1150. Program and data memory 1104 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1106 (including but not limited to keyboards, displays, pointing devices, etc.) can be coupled either directly or through intervening I/O controllers. Network adapter interfaces 1108 may also be integrated with the system to enable processing system 1100 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1110 may be integrated with the system to interface to one or more presentation devices, such as printing systems and displays for presentation of presentation data generated by processor 1102.

What is claimed is:

1. A photography system comprising:
an imaging device operable to generate a photograph of a passenger in a vehicle;
a billing system within the vehicle that accepts payment from the passenger for a fare; and
a controller operable to access the billing system to accept payment for the generated photograph.

2. The system of claim 1, further comprising:
a tracking system operable to determine the location of the vehicle, wherein
the controller is further operable to identify image data corresponding to the determined location, to integrate the image data with the photograph, and to provide the integrated photograph to the passenger.

3. The system of claim 2, wherein:
the image data comprises photographs of landmarks proximate to the location of the passenger vehicle.

4. The system of claim 2, wherein:
the location comprises an intersection, and
the image data comprises a textual description of the intersection.

5. The system of claim 1, wherein:
the controller is further operable to identify a cost of the photograph, to combine the cost of the photograph with the cost of a fare for traveling in the vehicle to a destination, and to operate the billing system to charge the passenger the combined cost.

6. The system of claim 1, wherein:
the controller is further operable to store the photograph at an internet location, and to provide the photograph to the passenger by displaying a hyperlink to the passenger that indicates the internet location.

7. The system of claim 1, wherein:
the imaging device is integrated into a touch screen device; and the controller is further operable to illuminate the passenger vehicle by increasing the brightness of the touch screen while the imaging device is generating the photograph.

8. A method for operating a photography system of a vehicle, comprising:
generating a photograph of a passenger in the vehicle with an imaging device;
accessing a billing system within the vehicle that accepts payment from the passenger for a fare; and
operating the billing system to accept payment for the generated photograph.

9. The method of claim 8, further comprising:
determining the location of the vehicle;
identifying image data corresponding to the determined location;
integrating the image data with the photograph; and
providing the integrated photograph to the passenger.

10. The method of claim 9, wherein:
the image data comprises photographs of landmarks proximate to the location of the passenger vehicle.

11. The method of claim 9, wherein:
the location comprises an intersection, and
the image data comprises a textual description of the intersection.

12. The method of claim 8, further comprising:
identifying a cost of the photograph;
combining the cost of the photograph with the cost of a fare for traveling in the vehicle to a destination; and
operating the billing system to charge the passenger the combined cost.

13. The method of claim 8, further comprising:
storing the photograph at an internet location; and
providing the photograph to the passenger by displaying a hyperlink to the passenger that indicates the internet location.

14. The method of claim 8, wherein:
the imaging device is integrated into a touch screen device, and the method further comprises:
illuminating the passenger vehicle by increasing the brightness of the touch screen while the imaging device is generating the photograph.

15. A non-transitory computer readable medium embodying programmed instructions which, when executed by a processor, are operable for performing a method comprising:
generating a photograph, of a passenger in a vehicle, with an imaging device;
accessing a billing system within the vehicle that accepts payment from the passenger for a fare; and
operating the billing system to accept payment for the generated photograph.

16. The medium of claim 15, the method further comprising:
determining the location of the vehicle;
identifying image data corresponding to the determined location;
integrating the image data with the photograph; and
providing the integrated photograph to the passenger.

17. The medium of claim 16, wherein:
the image data comprises photographs of landmarks proximate to the location of the passenger vehicle.

18. The medium of claim 16, wherein:
the location comprises an intersection, and
the image data comprises a textual description of the intersection.

19. The medium of claim 15, the method further comprising:
identifying a cost of the photograph;
combining the cost of the photograph with the cost of a fare for traveling in the vehicle to a destination; and
operating the billing system to charge the passenger the combined cost.

20. The medium of claim 15, the method further comprising:
storing the photograph at an internet location; and
providing the photograph to the passenger by displaying a hyperlink to the passenger that indicates the internet location.

* * * * *